(12) United States Patent
Delany et al.

(10) Patent No.: US 8,478,850 B2
(45) Date of Patent: Jul. 2, 2013

(54) PLATFORM COMPONENT ARCHITECTURE (PCA)-BASED SYSTEM, METHOD AND APPLICATION DESIGNER

(75) Inventors: Jim Delany, Merrimack, NH (US); Miguel Galvez, Salem, NH (US); Tarmey Stephen, Leominster, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 737 days.

(21) Appl. No.: 11/903,995

(22) Filed: Sep. 24, 2007

(65) Prior Publication Data

US 2008/0201467 A1   Aug. 21, 2008

Related U.S. Application Data

(60) Provisional application No. 60/846,553, filed on Sep. 22, 2006.

(51) Int. Cl.
*G06F 15/173* (2006.01)

(52) U.S. Cl.
USPC .................................... 709/223; 709/224

(58) Field of Classification Search
USPC ............................................. 709/224, 223
See application file for complete search history.

(56) References Cited

U.S. PATENT DOCUMENTS

| | | |
|---|---|---|
| 6,687,698 B1 | 2/2004 | Nixon et al. |
| 7,337,184 B1 * | 2/2008 | Or et al. .................. 1/1 |
| 7,912,873 B2 * | 3/2011 | Or et al. .................. 707/804 |
| 7,962,590 B1 * | 6/2011 | Or et al. .................. 709/223 |
| 2002/0188937 A1 | 12/2002 | Webster et al. |
| 2005/0050545 A1 * | 3/2005 | Moakley ............... 718/104 |
| 2005/0216585 A1 * | 9/2005 | Todorova et al. ..... 709/224 |
| 2007/0011281 A1 * | 1/2007 | Jhoney et al. ......... 709/220 |

FOREIGN PATENT DOCUMENTS

| | | |
|---|---|---|
| JP | 2002063098 | 2/2002 |
| JP | 2003022225 | 1/2003 |
| JP | 2005092330 | 4/2005 |
| WO | 03/060751 A1 | 7/2003 |
| WO | 2005/109122 A1 | 11/2005 |
| WO | 2005109122 A1 | 11/2005 |

OTHER PUBLICATIONS

Al-Muhtadi J et al., "secure smart homes using Jini and UIUC Sesame", Computer Security Applications, 2000, ACSAC '00. 16th Annual Conference New Orleans, LA, USA, Dec. 11-15, 2000, Los Alamitos CA, USA, IEEE Comput. Soc, US, Dec. 11, 2000, pp. 77-85.

Lea, R., et al., "Networing Home Entertainment Devices with HAVi", Computer, IEEE Service Center Los Alamitos, CA, US, vol. 33, No. 9, Sep. 1, 2000, pp. 35-43.

(Continued)

*Primary Examiner* — Brian P Whipple
(74) *Attorney, Agent, or Firm* — Kacvinsky Daisak PLLC

(57) ABSTRACT

An event management system, comprising a server comprising a platform component architecture (PCA) and a software engine, wherein the PCA is configured to provide runtime discovery and display of system components. The system also comprises a data source for storing user define data objects and applications; at least one system component; and at least one client for administering and monitoring user-defined events, wherein the PCA provides a common interface between the server, the data source, and the at least one client.

24 Claims, 8 Drawing Sheets

OTHER PUBLICATIONS

National Instruments: "Graphical Programming for PC Automation" Instrupedia, Your Interactive Encyclopedia for Instrumentation, XX, XX, vol. 1, No. 2, Jan. 1, 1987, pp. 6.21-6.28.
International Search Report and Written Opinion of the ISA/US for International Application No. PCT/US2007/020665, date of mailing May 8, 2008.
International Preliminary Report on Patentability for International Application Application No. PCT/US2007/020665, dated Mar. 24, 2009.
EPO Examination Report for EP 07838798.2, dated Feb. 12, 2010.
Office Action received for Japanese Patent Application No. 2009-529271, mailed Jun. 26, 2012, 4 pgs. English translation.
The EPO Search Report for EP Patent Application No. 12 15 6247; dated,Jul. 6, 2012; Performed at the Hague; by authorized Agent Sven Krause.
The EPO Writen Opinion sent with the exended EPO Search Report for EP Patent Appliation No. 12 15 6247;dated, Jul. 6, 2012; Performed at the Hague; by authorized Agent, Sven Krause.
Roger Lea, et al.; "Networking Home Entertainment Devices With HAVi"; Computer, IEEE Service Center, Los Alamitos, CA, US:vol. 33, No. 9; Published Sep. 2000; 35-43, XP000987591, p. 35, left-hand column, line 1-line 25; p. 37, left-hand column, line 35; 1ine 52; p. 42, left-hand column, line 47.
Jalal Al-Muhtadi et al.: "Secure Smart Homes Using Jini and UIUC Sesame"; Computer Security Applications, 2000. ACSAC '00. 16th Annual Conference New Orleans, LA, USA Dec. 11-15, 2000, Los Alamitos, CA, USA.IEEE Comput. Soc, US, Dec. 11, 2000; pp. 77-85; XP010529803; SBN: 0-7695-0859-6; abstract; paragraphs [001.]; [02.1]; [03.1]; [03.3],[004.] and [04,3]; Figures 1,3-5.

* cited by examiner

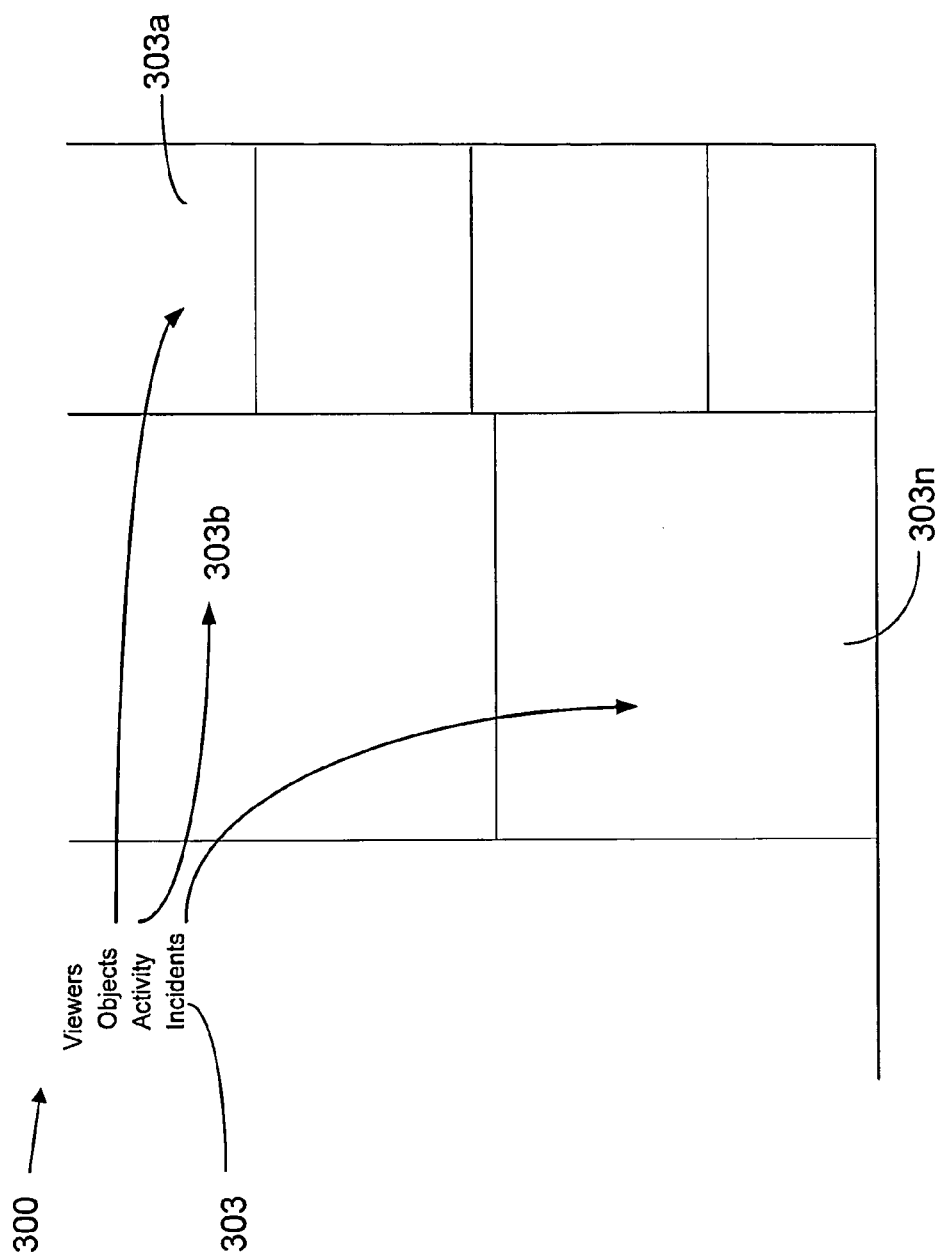

PLATFORM COMPONENT ARCHITECTURE (PCA)-BASED SYSTEM, METHOD AND APPLICATION DESIGNER

TECHNICAL FIELD

The invention relates generally to event management systems. More particularly, the invention relates to a system and method for event management.

BACKGROUND

Currently, many different industries desire the ability to actively control and monitor different kinds of physical devices, concurrently. For example, in the fire and security industry, it is desirable to be able to simultaneously control and monitor physical devices such as doors, alarms, video recorders, etc. To this end, tools such as event management systems have been created. Existing event management system, however, are limited as to their ability to truly integrate multiple devices. To illustrate, if a new physical device were added to an existing system, the system would be required to modify its architectural structure in order to accommodate the new physical device. To do this, the system would also be required to maintain and store intricate details about the new device's methods and specifications. As a result, existing event systems are monolithic and provide little independence from system devices. Furthermore, even if a particular device is able to be integrated into an existing system, conventional event management systems require a recompile before the new device is accessible to the rest of the system.

Accordingly, it is desirable to have a method and system that provides for the full integration of any number of devices, without regard to the type or kind of the device being integrated. It is also desirable that this method and system provide for the runtime addition of additional system devices, thereby eliminating the need to recompile.

SUMMARY OF THE INVENTION

The invention relates to an event management system that may be used in an event environment. The event environment may include, for example, the event management system connected via a wide area network to various types of video surveillance systems and access control systems, as well as various facilities management/security workstations, as further described herein.

The event management system itself may include a server, a data source for storing user defined data objects and applications, at least one system component, and at least one client for administering and monitoring user-defined events. The server may comprise a platform component architecture (PCA) and a software engine, wherein the PCA may be configured to provide runtime discovery and display of system components. The PCA may also provide a common interface between the server, the data source, and the at least one client.

In an alternate embodiment, the PCA may be configured for use in designing user-defined applications. In such an embodiment, the PCA may further comprise an application layout editor.

BRIEF DESCRIPTION OF THE DRAWINGS

The invention is best understood from a reading of the following detailed description, taken in conjunction with the accompanying figures in the drawings wherein:

FIG. 3 illustrates an application layout editor utilizing a drag-and-drop process in accordance with the invention;

DETAILED DESCRIPTION

Figure 1:
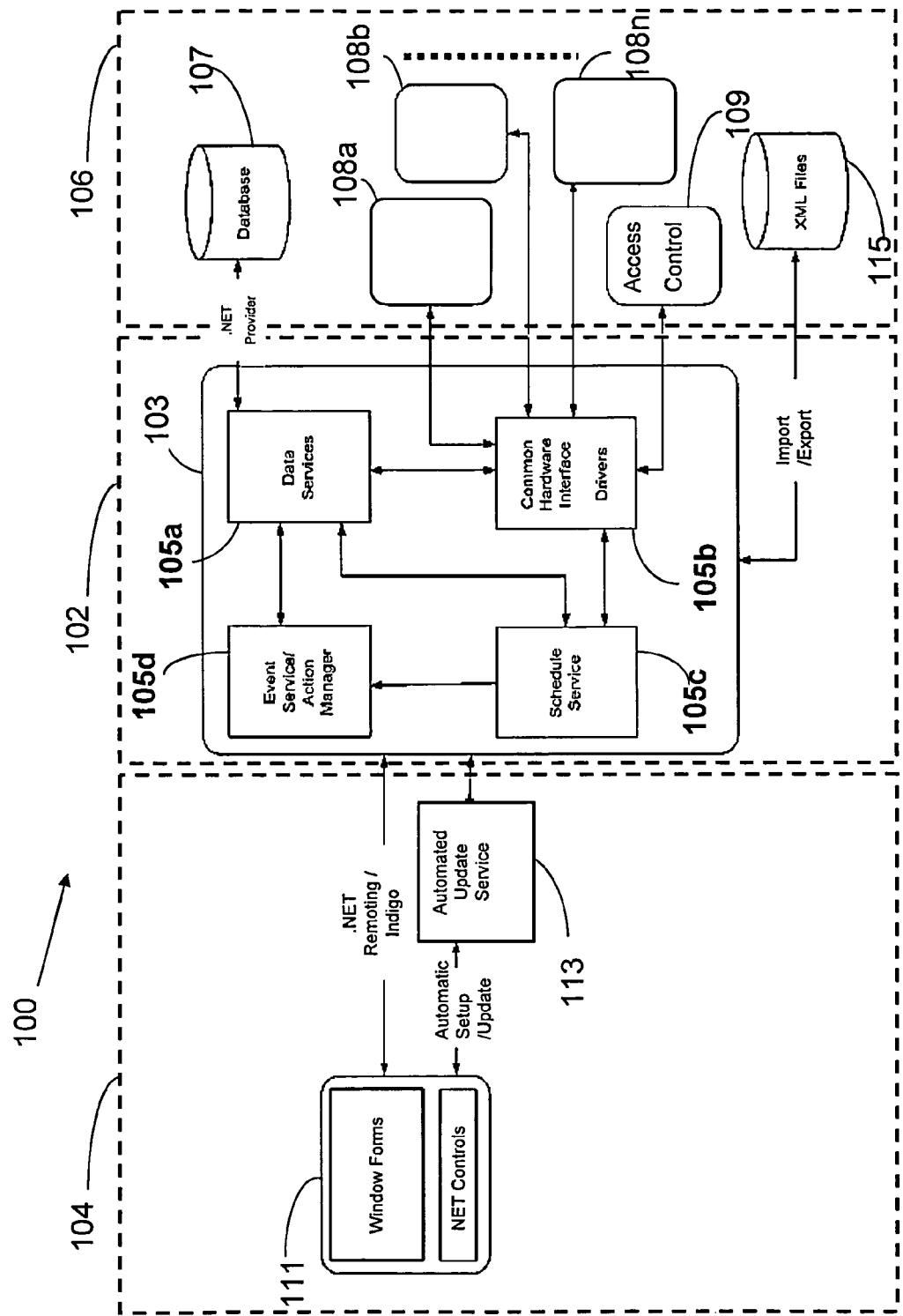
FIG. 1 illustrates an events management system in accordance with the invention.

The invention relates to an event management system incorporated for use in controlling physical system components. In addition, the system of the invention provides for the runtime discovery, integration, display, and active management of the physical system components. Once a physical system component has been successfully added and integrated into the system, the system provides for client access and/or monitoring of that component's functions. The client access may occur manually, on a scheduled basis, or on a condition-related basis.

In accordance with the invention, an event management system may incorporate software applications built upon a C#.NET programming language. As is commonly known to one of ordinary skill in the art, the .NET architecture provides a common framework for development and operation of software applications and Web services. More specifically, .NET maintains a class library which provides standard functionality such as input/output, string manipulation, security management, network communications, thread management, and user interface design features, and further provides a programming language independent runtime environment for applications.

In addition, the system in accordance with an embodiment of the invention may incorporate Window Communication Foundation (WCF) standards, for further providing secure reliable communication over LANs, WANs, Web Servers, Internet, etc. As is known to one of ordinary skill in the art, WCF is built on the .NET framework and introduces a way to make XML (Extensible Markup Language) transport more efficient by using binary representation within the WCF system providing improved performance and a unified programming model capable of reaching from a single system to the entire Internet. One advantage of the WCF programming model is that it unifies Web Services, Distributed Transactions, and Message Queues into a single service-oriented programming model for distributed computing, with the intended function of providing a rapid application development methodology to the development of web services, with a single API for inter-process communication in a local machine, LAN, or over the WAN. Another advantage of the WCF is that it may use SOAP messages for communication between two processes, thereby making WCF based applications interoperable with any other process that communicates via SOAP messages. On the other hand, when a WCF process communicates with a non-WCF process, XML based encoding is used for the SOAP messages which are encoded in an optimized binary format, to further optimize the communication.

The use of WCF coupled with the .NET framework ensures that the system will be compatible with all types of network architectures, and further provide future support of IPv6. However, it should be understood, that embodiments of the invention are not limited to the use of C#.NET or WCF, and may utilize a plurality of different programming languages, such as VB.NET, Java, C++, etc.

As will be further discussed below, the system of the invention may be configured to utilize any number of applications and services deemed appropriate for the particular implementation. For example, the system may use DNS (Domain Name Service) names and DHCP to communicate with all IP devices for ease of installation and to further provide the ability to readily make upgrades to the system. Additionally, the system may utilize NAT (Network Address Translations) to work with firewall systems and networks. Hardware panels may also be utilized by the system to provide dual network path for network redundancy. However, it should be understood, that the foregoing description is by way of example only and the invention is not limited to the use of the foregoing applications, services, and hardware. Accordingly, other applications, services, and hardware may be further utilized, as is readily known to those skilled in the art.

Referring now to FIG. 1, an event management system (100) in accordance with the invention is shown. For illustrative purposes, the system (100) of FIG. 1 is configured for use in Fire and Security Event Management. It should be understood, however, that the event management system (100) of the invention may be customized for use in any desired industry. Returning now to FIG. 1, the architecture of the system (100) is herein described as having three distinct architectural components: 1) a server (102); 2) at least one client (104); and 3) at least one data source (106). The server (102) is the fundamental architectural component of this system (100), as it provides, via a platform component architecture (PCA) (103), a common interface among and between the system's (100) clients (104) and data sources (106). More particularly, the PCA (103) provides a common interface between the system's (100) Operating System (not shown) and the system's (100) applications (not shown). In sum, the server (102) is what enables the clients (104) to actively manage the system's database (107) and numerous other system components (108a ... 108n).

In the embodiment of FIG. 1, the PCA (103) may be configured to provide the following event management tasks for all applications and drivers associated with the system (100):

| Events | Time Zones |
|---|---|
| Operators | Licensing |
| User Privileges | Import/Export |
| Scheduling | Reporting |
| Graphics | Application Layouts |
| Dynamic Views | UI controls |
| Holidays | Framework |

It should be noted, that the system (100) of the invention is not limited thereto. Indeed, the PCA (103) of the invention may provide any number of services in any combination as deemed appropriate for the particular implementation. To this end, the PCA (103) provides a set of interfaces to all of the features offered by this platform. As will be further discussed below, the PCA (103) may be configured to allow third party manufacturers to integrate their applications and/or drivers into the event management system (100), thus, enabling the system (100) to have a fully open architecture for all types of integration.

The above-described services may be categorized into four fundamental system services: 1) data services (105a); 2) common interface and driver services (105b); 3) scheduling services (105c); and 4) event/action management services (105d). Driving the PCA 103 is a software engine (not shown). As will be further discussed below, it is this software engine (in conjunction with the PCA (103)) that provides the system 100 with the unique ability have a fully open architecture that accommodates all types of integration, and to perform this integration without making any change whatsoever to the system's (100) architecture.

Referring again to FIG. 1, the PCA's (103) system services will now be discussed in further detail. Data services (105a), as indicated in FIG. 1, provides the PCA (103) with access to the system's database (107). The database (107) may store, for example, system objects, security objects, drivers, applications, system events, etc. The database (107) may be configured to perform such services as high availability and disaster recovery without the need of external software; and encryption of sensitive data objects such as pin numbers, passwords, social security numbers, etc. By maintaining a separation of the system database (107) and the server (102), the system (100) is able to readily interface with most standard database management systems (DBMSs) on the market today with minimal additional coding to the system (100). This, in turn, facilitates making the system (100) compatible with most IT infrastructures. In the present system (100), database independence may be achieved using grammar parsing and native data-source connections.

A complete separation of object models and database models enables application development via objects, rather than tables which, as can be appreciated by those skilled in the art, vastly simplifies development. To this end, the PCA (103) of the system (100) provides consistent object model output that is fully customizable. This concept is further illustrated below.

In the embodiment of FIG. 1, data objects imported into the system (100), via for example, the XML files storage device (115), may be audited and validated before storing in the database (107). This audit may contain information such as the data imported, data/time stamps, and operator information. Exported data does need to be audited and/or validated. The export of data from the database (107) may be protected by username/password and operator privileges. Sensitive data such as pin numbers, social security numbers, etc. may also be encrypted in the database (107).

Optionally, the system (100) may be configured to encrypt data communication between the server (102), clients (104), and data sources (106). The encryption may be AES encryption, although the system (100) may implement encryption which could be made compliant with the NIST FIPS140-2 standard.

Runtime Discovery

The common interface and driver services (105b) of the PCA (103) enables the PCA (103) to add and integrate physical system components (108a ... n), access control components (109), and external software components (not shown) into the existing system (100) at runtime, all without having to recompile or modify the system's architecture. As a result, the system (100) is fully scalable, including with third party "out-of-the-box" system components, and with system components hosted on separate machines. All that is required of the system components is that they provide the necessary "interface" required by PCA (103) to enable their integration.

A component interface comprises, for example, a component's methods and properties information. Methods information specifies the functional capabilities of the particular component, while the properties information provides information such as the component's configuration, status, and the like for defining the component. Optionally, a component's interface may also include meta-data for specifying additional component information to the system (100). Meta-data may be useful, for example, to enable dynamic views for formatting information for presentation to a user.

In operation, physical system components (e.g., 108a . . . n, 109) are initially installed using, for example, a Windows Installer or MSI technology. These components (e.g., 108a . . . n, 109) may be installed manually on both the server (102) and the clients (104). Once the system (100) is up and running, additional system components may then be added at runtime. Upon adding a new system component, the interface and driver services (105b) auto-discovers the component and accesses and reads the new component's interface, which as discussed above, specifies the component's methods and properties information.

Using, for example, .NET reflection, the new component may be read and invoked using well-known interfaces defined in base interfaces provided by the PCA (103). The new component may then be brought into the process space of the runtime component of the PCA (103). The PCA (103) provides an application that parses user defined database tables and interfaces of the new component to write, for example, C# code which is used to bridge the schema of the user defined objects and the schema of the database tables that correspond to them. This provides a standard way of persisting/reading data to and from the system database (107) while developers need only be aware of the schema of the objects that are part of the new component, and not the database schema. In one embodiment, the interface services (105b) utilizes an application that writes driver(s) in C# code, although any appropriate coding language may be utilized.

After a new component is integrated into the system (100) as described above, the interface and driver services (105b) avail the new component's methods and properties to all other components (108a . . . n, 109) in the system (100). Conversely, the newly added component may have full access to the properties and methods of all pre-existing system components (108a . . . n, 109). By leveraging the technologies provide in, for example, the Microsoft .NET framework, the new component may be brought in to the process space of the PCA's (103) runtime and operate as if it were integrated at the development time of the PCA (103). The specific portions of the .NET framework utilized to facilitate this feature may be late-binding calls through Reflection.

In addition, the interface and driver services (105b) may optionally access or subscribe to receive real time status update information, via an Automatic Update Service (113), about the newly added component. In this manner, the system (100) will have the necessary information for optimal operation of the new component. Updates (and upgrades) of new components and the clients (104) may be accomplished using "BITS" technology. As known to those skilled in the art, "BITS" is a Windows-based system component that provides concurrent foreground and background file transfers. These file transfers include uploads and downloads. "BITS" uses idle network bandwidth to complete file transfers. "BITS" is used to transfer files by the Automatic Update Service (113), although "BITS" may be utilized by other update programs known to those skilled in the art.

Figure 5:
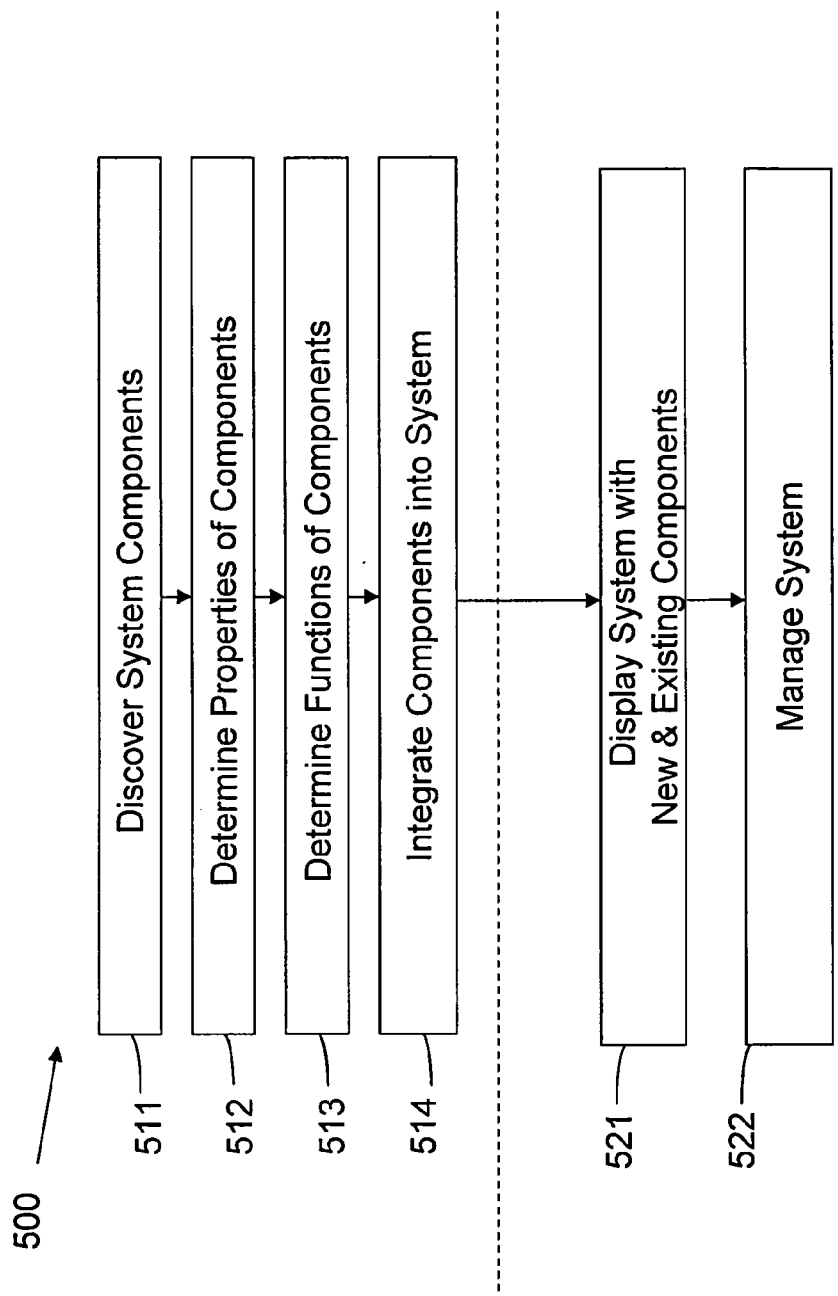
FIG. 5 illustrates a flow diagram for discovering, integrating, displaying, and managing system components in an event management system.
Figure 6:
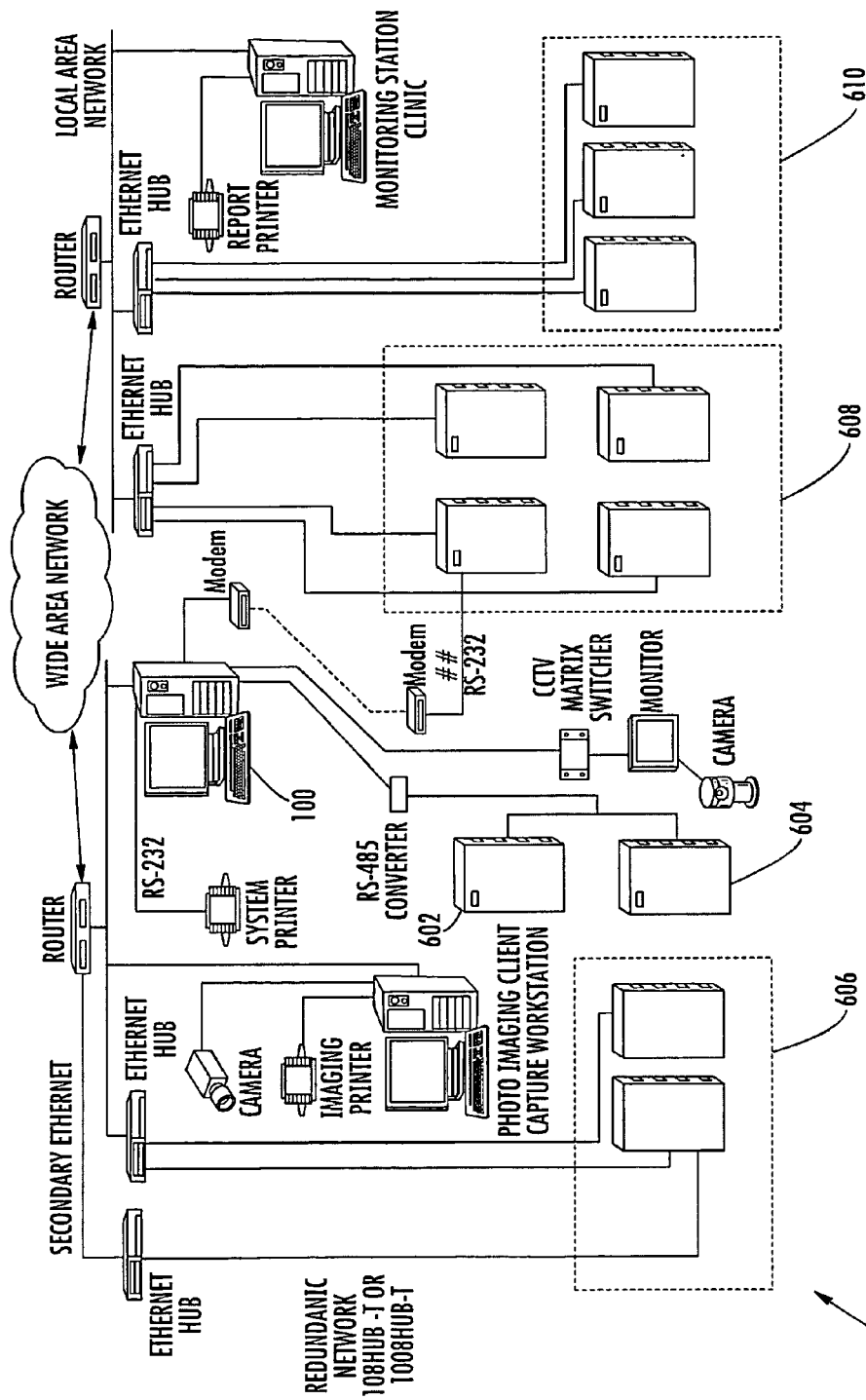
FIG. 6 illustrates an event environment incorporating an event management system in accordance with the invention.

Referring now to FIG. 5, FIG. 5 illustrates a computer program-based method 500 according to an embodiment of the invention. The method begins at Step 511, wherein a component newly added to an event management system is discovered. This component may be any computer recognizable entity such as an event, input, output, state change, etc and is not limited thereto.

Next, the method 500 determines the properties (Step 512) and the functions (Step 513) of the newly added component via the component's interface. Preferably, metadata is also included in the component's interface, thereby facilitating the integration of this new component into the system. After the properties (Step 512) and functions (Step 513) of the component are determined, the method integrates the component into the system (Step 514). This integration, along with the discovery of the component, may occur when the system is initiated, or at runtime.

Once the new component is successfully integrated (Step 514) into the system, the new component may be displayed (Step 521) and managed (Step 522) by a client, also at runtime. It should be noted, that this new component will have access to the properties and functions of components previously included in the system, and likewise, the existing components will have access to the properties and functions of the new component.

Runtime Display

Once a component has been added and integrated into the system (100), the system (100) provides for client (104) access and/or monitoring of the newly added component at runtime. To this end, the system (100) comprises a single software component for enabling a client (104), via an administrative/monitoring device (111), to monitor and actively manage all system (100) components, including newly added components, at runtime. The administrative/monitoring device (111) may be configured to provide the following administrative capabilities:

Programming of all the hardware devices attached physically or logically to the system (100);

Programming of all the personnel data such as creation, deletion and/or modification of personnel records;

Status of all objects configured and enabled (panel, servers, cameras, hardware . . . etc);

Ability to manage operators and administrators of the system (100), including the management of user privileges and personal views;

Programming of system operations such as backups updates and upgrades;

Customizing of the monitoring views and their operators; provide a dynamic visual tree structure for the system (100) as it is configured, which may be updated as objects are added, deleted and modified.

Display of static as well as dynamic information pertaining to any object supported by the system (100).

Creation and deletion of instances of any object supported by the system (100).

Additionally, the administrative/monitoring device (111) may provide the following monitoring capabilities:

Annunciation of events and activities in real time;

Providing a set of panes for displaying certain types of activities, such as:

Event Viewer Annunciation of events configured in the system;

Activity Viewer Activity monitor;

Explorer Bar having, for example, the following choices on a menu:

Non Hardware Status (Doors, reports, dynamic views, operators, manual actions, and events);

Hardware Status (Controllers, readers, inputs, outputs, boards);

Video (Servers, cameras, tours and views, CCTV);
External Applications if any are configured;
Object viewer (Journal logs, video servers, cameras . . . etc);
Ability to view multiple monitoring setups using either tabbed views or multiple screens;
Ability to perform manual actions on certain objects (doors, cameras . . . etc);
Ability to view image of cardholder on admits, rejects or noticed events; and
Ability to do manual challenge on certain events or on certain conditions such as threat level.

Unlike conventional display and management services, those of the invention do not require special coding. To the contrary, new components may be displayed and actively manipulated, at runtime, without the system (100) having intricate knowledge of the component. Even pre-existing components within the system (100) become aware of the existence and characteristics of the new components, enabling the displaying and editing these new components. Examples of this would be a DynamicViews feature of the system (100) being able to display a DynamicView of a newly added component or create events on the new component.

As explained above, in order to add a new component into the existing system (100), the new component may be required to provide a component "interface". The component interface may include information regarding the component's methods and properties, which is utilized for facilitating the integration of the component into the system (100). Other types of information, including meta-data, may also be included in the new component's interface.

Once a new component is added into the system (100) the software component (not shown) that drives the display the Administrative/monitoring device (111) utilizes the information in the component interface to determine display parameters such as, for example: how the component should be displayed; the type of display that ought to be utilized; whether particular display information ought to be translated; whether the component ought to be displayed at all; etc. Similarly, parameters relevant to the manipulation and management of the component are also determined from the component's interface and metadata information.

Information such as the format of display, limits, and other similar user-interface information may be derived from the metadata contained within the component and interpreted at runtime to present to a user the component(s) requested. With this information, the system (100) may customize itself to enable a client (104) to display and actively manage new and previously unknown components. In addition, since this information is garnered from the new components, a user interface may determine a desired look and feel to be associated with any given property which is displayed to a user. This same information may also enable the system (100) to regulate the editing of information in a customized way which is specific to how the particular information is displayed. As noted above, a client (104) may access and/or manage new components manually, via an administrative/monitoring device (111). Alternatively or additionally, new components may be managed on a scheduled basis, or a condition-related basis, via the scheduling services (105c) provided by the PCA (103).

The event and action management components (105d) are the engine that drives the state machine of the runtime of the PCA (103). The action manager (105d) manages a list of all actions that may have been configured within the system (100). An action represents a state change that should be initiated based on the detection of a specific state change of another object in the system (100). For example, an action may be configured to activate a specific output if and when a specific input is activated.

It is noted that in the PCA (103) there are no inputs or outputs and that the example above is an illustration of what a product can do with a PCA (103). Also, actions are not exclusive to changing state, and may be used for other operations as well, such as changing properties.

The action manager (105d) manages actions. Once again, the various components in the system (100), as well as user defined components, may define and extend the concept of what an action can be, and implement those actions.

The action manager (105d) may subscribe to state changes of all components within the system (100). When it (105d) detects a state change, it may determine if any action is to be taken, and if so, initiate that state change. Additionally, the action manager (105d) optionally maintains a cause list for every object in the system. The cause list may be used to determine the next state of a component based on the priority of and time of state change of any potential causer.

An event is one specific way of packaging a set of actions. It provides additional capabilities such as displaying instructions on the monitoring station, requiring acknowledgement by an operator, and consolidating actions that may be triggered by a number of causes.

It should be noted that although the scheduling (105c) and event/action management services (105d) are described in terms of their use in the runtime discovery and display of newly added system components, their usefulness is not limited thereto. Both the scheduling (105c) and event/action management (105d) services may assist in enabling and disabling access to system (100) components, as well as in regulating the performance of specific component operations, whether the operations are performed periodically, or at particular user-defined instances. Additionally, the PCA (103) described above is not limited to the services illustrated in FIG. 1. In fact, the PCA (103) in accordance with embodiments of the invention may be configured to provide any number of event management services, including, but not limited to, those services listed below:

Component based architecture
All interfaces through properties and methods
LAN & WAN Communications using WCF (Indigo)
Installer, automatic update of clients
Localization ready, resource editor
Feature licensing (no dongle required)
Encryption toolkit and encryption of all data paths
Database access (db independence)
   Currently SQL Server and SQL Express
Database backup and restore
Auditing—record level & field level
Journaling (historical log)—including authentication
Import/Export
   XML-based
   Manual, scheduled, & automated of all classes
Single Sign-on
   Utilizing the Windows security model
Operators
Privileges—class level & object level
Application designer
Real time monitoring
Maps—vector based, CAD files
Reports
Dynamic views
Query builder
Schedules
Holidays Events
Time Zones
Email notification
Templates
Online help Although the event management system is herein described generally, it should be understood that embodiments of the invention may be configured for use in any environment requiring the control and management of system components. For example, embodiments may be configured as a Fire and Security event management system. In such an implementation, clients could monitor and manage, via a client display, any number of fire and security devices, such as data inputs and outputs, card readers, events, doors, alarms, cameras, etc. In addition, the additional fire and security components may be added to the system, at runtime, via a PCA.

Application Designer

Independent from the event management system (100) described above, the PCA of the invention may be utilized as an application designer, for use in designing custom applications. The application designer is an extensible and customizable Windows-based module that can be utilized to create custom applications having a certain look and feel of a Microsoft Windows Application. Rather than providing a customizable-application, the application designer in accordance with embodiments of the invention may provide the tools to enable a user to create the application. The application designer may include several default application layouts, thereby providing a user with a basis for a new design. In addition, this application designer module may enable, for example, system administrators to create application layouts for accessing pre-existing system components as well as newly added system components. To this end, the application designer module includes an agnostic engine. This engine enables a user to create, for example, as many different layouts as desired, without actually having to make changes to the engine itself. This capability may be achieved by designing the engine as an interpreter of layouts so it does not know anything about the layouts themselves but it does know how to manipulate them as well as interact with them. Optionally, the application designer module may include a set of routines (i.e., API), which that may be utilized to extend the functionality of a pre-existing application.

Figure 2:
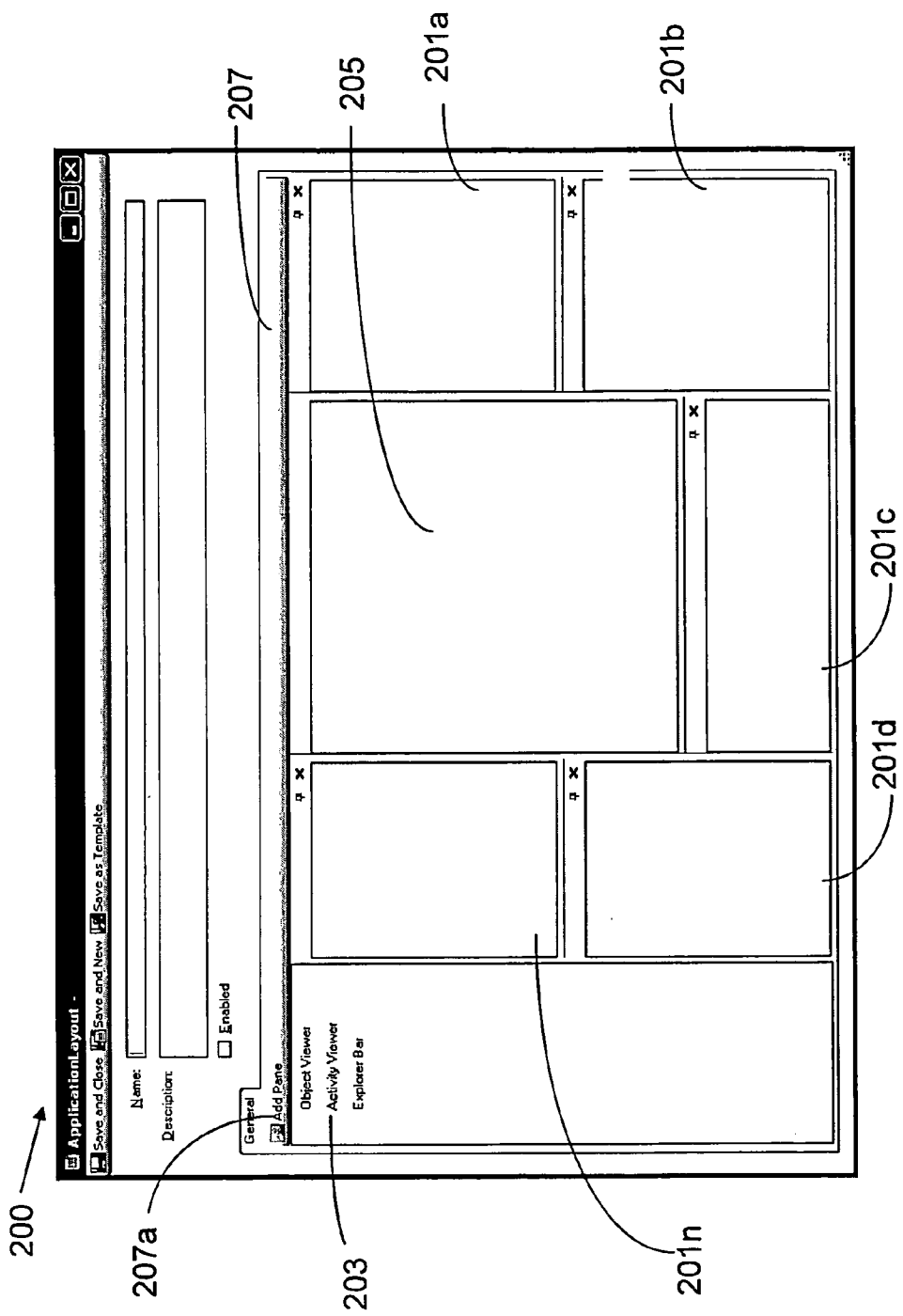
FIG. 2 illustrates an application layout editor in accordance with the invention.
Figure 2A:
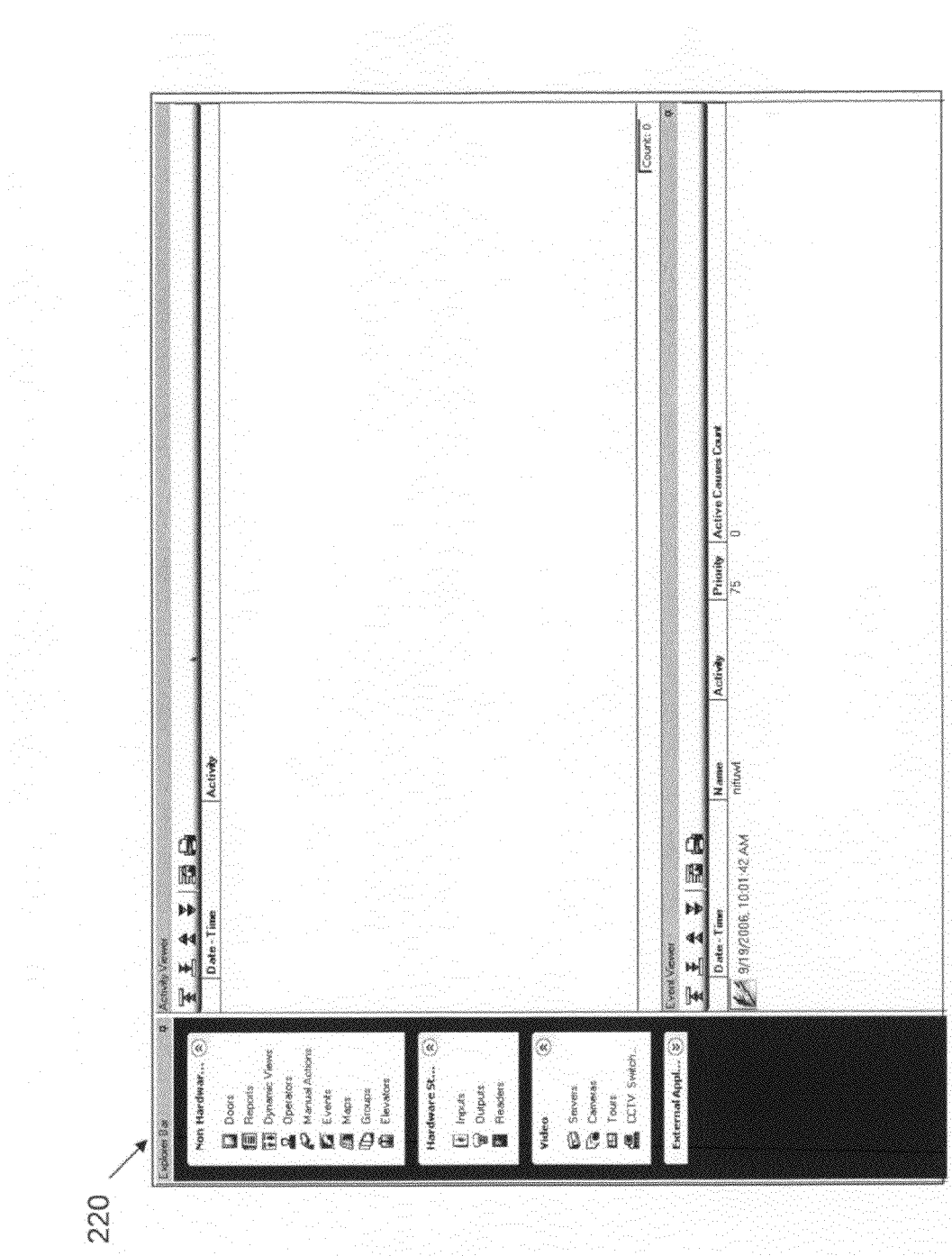
FIG. 2A is an instance of an application layout that has been designed with the application layout editor illustrated in FIG. 2.

Referring now to FIG. 2, an application layout editor (200) for use in designing custom applications is illustrated. Utilizing the agnostic engine, a user may design a customizable application layout via the application layout editor (200). The layout may be created, for example, in a computer environment, such as is illustrated in FIGS. 2 and 2A. FIG. 2A is an instance of an Application Layout (220) that has been designed using the Application Layout Editor illustrated in FIG. 2. The application layout editor (200) supports the configuration of any user desired layout. To this end, the Editor (200) may provide the following capabilities:

Add/Remove panes from a layout.
Dock panes in any of the four window sides
Undock panes after they have being docked to a window side.
Add tabs to panes.
Remove tabs from panes.
Resizing of panes.
Ability to associate viewers with each particular pane. The support of tab pages inside a pane shall allow multiple viewer support.

The application layout editor (200) enables users to create custom layouts for use in a monitoring station application, for example. The main idea is to move and remove window panes (201a . . . n) to accommodate for a list of viewers (203) a user would like to use.

As shown in FIG. 2, the layout editor (200) may comprise six (6) window panes (201a . . . n, 205) with which a user may interact with. These panes (201a . . . n, 205) are placeholders used to create a desired application look and feel. In addition, the panes (201a . . . n, 205) dictate the application window behavior. As further detailed below, viewers may be dropped into the panes (201a . . . n) to provide functionality to the actual application. The number of panes may be increased or decreased as deemed appropriate by the particular implementation. Most of the window panes (201a . . . n) shown are configured to support being closed, dragged to another edge, and unpinned, as indicated by the small "x" and unpin button in those panes (201a . . . n). One pane (205), however, does not contain an "x" button or an unpin button. This pane (205) is referred to as a fill area. The filler pane (205) is used to avoid the application having empty spaces and having a user be confused about the unused area. All the other panes (201a . . . n) may be docked around this fill area (205), which is used to fill the remaining of the layout. In other words, the fill pane (205) may resize to fill the client area. When a pane is unpinned, it may auto-hide to its closest outer edge, similar to for example, the auto-hide feature used in the Windows XP task bar. In this manner, when a user moves his mouse close to the edge a particular pane is docked at, that particular task bar will appear to the user. This auto-hiding feature is utilized inside the layout editor (200) with the window panes (205) that are unpinned. Supporting unpinned panes allows the layouts to have a large number of panes without consuming a lot of space on a display window. For those panes (201a . . . n) that do include the "x" and unpin button, a user may close those panes that are not going to be used in conjunction with a viewer.

The toolbar (207) may display the add pane button (207a) which is disabled as long as the six default panes are visible. Once one of them is closed, this button may be enabled to allow the user to display the previously closed panes. In addition, the layout editor (200) may include a combo-box (not shown) for enabling a user to prevent the layout from changing at runtime (e.g., sizing and floating). This combo box is preferably defaulted to "false", which means that the layout can change at runtime. It is upon the user to set it to "true", which prevents runtime layout changes.

Once the panes (201a . . . n) are all set in place as desired by a user, the user will be able to associate a viewer (203) with each individual pane (201a . . . n). Viewers (203) are components that address a certain problem or satisfy certain use requirements. In other words, viewers (203) provide desired application functionalities. To accomplish this, the layout editor (200) supports "drag-and-drop" operations between the viewers list (203) and the panes (201a . . . n) themselves. Once a viewer (203) is dropped into a pane (201a . . . n), a layout engine (not shown) may auto discover the viewer(s) (203). It should be noted that the viewers (203) may be developed separately, as long as the interfaces are implemented correctly. The "drag-and-drop" concept is best explained with reference to FIG. 3.

Referring now to FIG. 3, in illustration of drag-and-drop operations between a viewers list (303) and window panes (301a . . . n) is shown. In general, drag-and-drop operations may follow the following rules:

The viewer list (303) is a drop source and not a drop target;
Each individual pane (301a . . . n) is a drop target and not a drag source;

Pressing the esc key cancels the drag/drop operation;

Dropping outside the layout editor is not permitted;

Dropping a viewer (303) onto a pane (301*a* . . . *n*) that does not hold a viewer (303) results in the creation of a new tab to accommodate for the viewer. At runtime, panes that contain only one viewer (303) will not show a tab; and Dropping a viewer (303) onto a pane (301*a* . . . *n*) that already holds a viewer (303) results in the creation of a new tab to accommodate multiple viewers. At runtime, the window pane shows the tabs to allow a user to flip back and forth between them.

As soon as viewer (303) is dropped into a pane (301*a* . . . *n*), a configuration editor (not shown) for that viewer (303) may appear to enable a user to setup the viewer's (303) runtime behavior.

It should be noted that it is possible for a viewer (303) to have some configuration on its own. To illustrate, an activity viewer may be configured to enable user to turn a tool bar off when it is not being used. For this to happen, an interface that the layout engine (not shown) knows about and is implemented by the viewer, is called on the drop operation. In other words, when a drop is triggered, a viewers configuration window is called and then the actual viewer (303) is configured. In this manner, the viewers (303) may themselves provide a particular configuration, without requiring the layout engine to facilitate or even to have knowledge about the configuration. All that is required of the layout engine is the ability to display the particular viewer on a user-display. This viewer-configuration feature may be achieved via, for example, a standard .NET windows operation.

Figure 4:
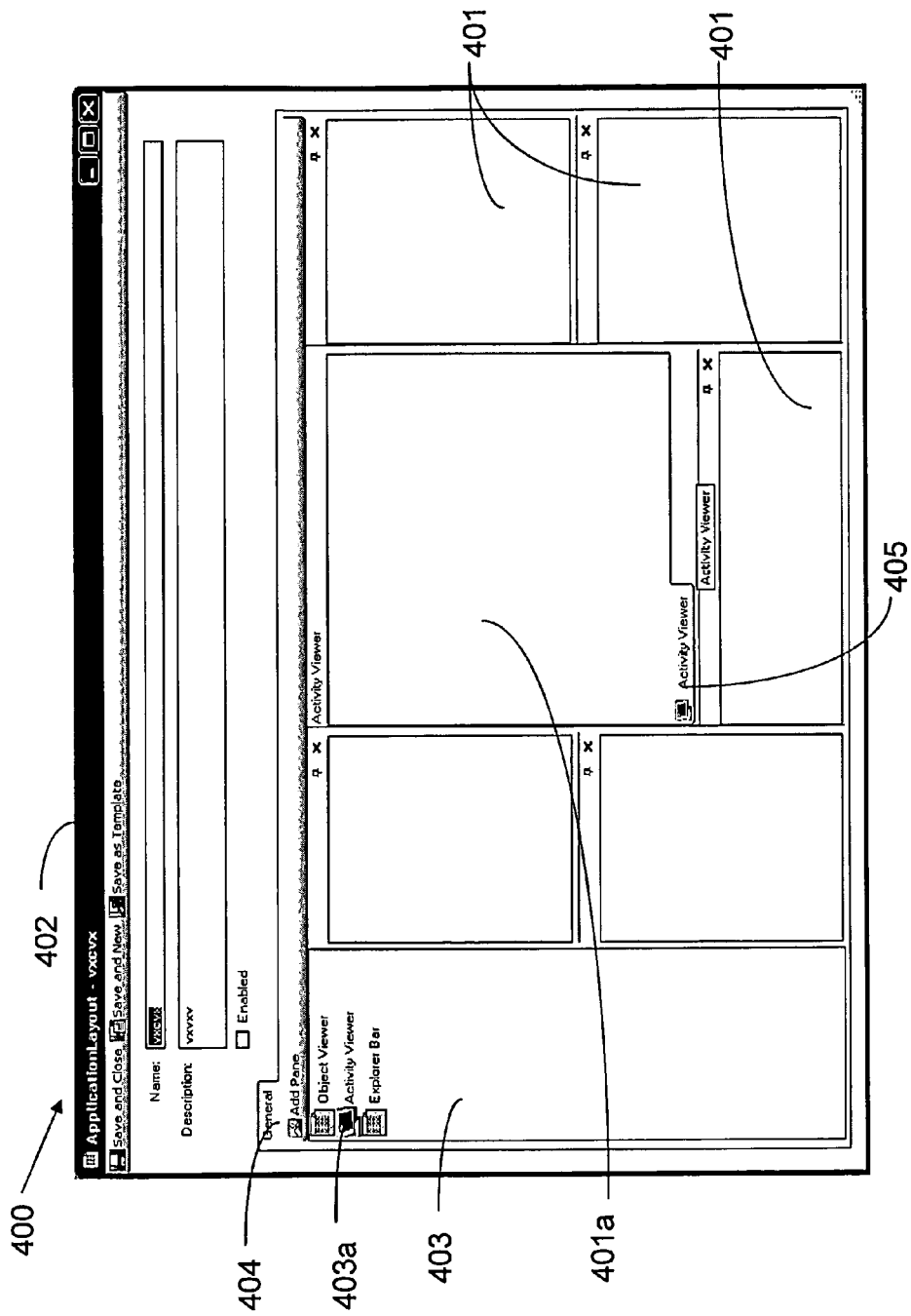
FIG. 4 illustrates a populated application layout editor in accordance with the invention.

Referring now to FIG. 4, a layout editor (400) showing a viewer (403*a*) that has been dropped onto a window pane (401*a*) is provided. As shown in FIG. 4, once the viewer (403*a*) (Activity Viewer) has been dropped onto the window pane (401*a*), a tab (205) identifying the viewer (403*a*) appears in the pane (401*a*). This window pane (401*a*) may also provide a permanent "home" for the viewer (403*a*) once the layout is completed and the application is in use. Right clicking on this tab (205), for example, may allow the user to perform the following operations via a context menu:

Go back to the configuration of the viewer after it has been configured

Close the viewer if needed.

Rename the title of the container of the viewer.

The supported viewers (403) that could be dropped inside of panes (401) may be classified by any desired list of categories. To illustrate, one example implementation in a fire and security industry may desire to classify viewers according to the following categories:

CrossFire object viewers (Graphics, Reports, Dynamic Views)

CrossFire application's object viewers (Ex: NextGen video cameras)

Dedicated viewers (Ex: Activity viewer)

Once all the viewers have been dropped into a corresponding window pane, the application layout editor of the invention may show the layout populated with all the viewers configured at design time. This layout may resemble the layout editor (400) illustrated in FIG. 4, but without some of the editing capabilities. These editing capabilities include the toolbar (404) and the left side viewers list (403). In addition, the user may be permitted to undock and resize panes, and may not be permitted to add or configure any of the panes.

At runtime, the application layout viewer of the invention may provide pane communication to support one viewer reacting to another viewer's activity. This communication capability may permit viewers to send commands to other viewers, thereby enabling a resulting application to be viewed as a single component. To accomplish such communication, basic executor's event wiring between the viewers may be utilized. Viewers can elect to support certain interfaces that are used for this communication. In operation, there are certain well known events that viewers can select to listen to. In this manner, viewers may communicate with each other. To illustrate, there are at least two situations in which the communication can happen:

In the case the viewer needs to display all the objects of one type (ex: graphics). At initialization, it shall look for the client component that encapsulates the type of objects in question (ex: graphics client component) and it wires an event handler to the view executor exposed by the client component (ex: view executor for graphics). This event handler is called every time a graphic is viewed. Once this infrastructure is in place at runtime, the viewer can service the display of the respective user interface (ex: an instance of a graphic).

In the case the viewer needs to display a list of instances of a type of object (ex: First floor graphic and Second floor graphic), the above procedure is also valid. The only difference is that the viewer shall filter for what graphics is shall display the respective user interface.

Once a layout is created in the system, a developer may create a brand new application using, for example, Developer Studio 2005 to incorporate the previously created layout. An application under .NET, for example, usually has a Windows form that is shown to a user once an application is launched. Each created layout has a Windows control that is associated with it. This Windows control is what may be added to the Windows form described above. Once a particular layout, via its Windows control, is added to the Windows form and the form is displayed to a user, the layout may be populated with all the viewers, thereby creating a new application with a previously created layout.

Each pane in the layout may correspond to a pre-existing system component. The connection between the panes and the components may be made when the viewer is dropped into a pane at configuration. The layout engine coordinates the association between components and panes. These panes may be placed via "drag-and-drop" in any desired location throughout the layout window. Once the user completes the layout, the layout may be saved and thus, be ready for use in an application. If at a later time, while the application layout is in use, a new component is added to the system, the user will have the option of adding that component, in real time, as an option to the application layout design. To accomplish this, a new viewer may be displayed in the available viewers list and via the same mechanism as the other viewers (i.e., drag and drop), the new component may be added to the particular application layout.

It should be noted that the agnostic engine does not have to be aware, nor is it required to understand, the properties and/or functional specifications of the new component. All that may be required is that the engine recognize that a new component is present and that it is now available as an option for the application layout. In this manner, applications may be extended with viewers that are beyond the scope and "knowledge" of the engine itself. The engine is only required to understand interfaces, as opposed to understanding particular viewer configurations, and how to coordinate the display of such configurations. To illustrate, once a particular configuration is entered by a user, that configuration data is captured by the viewer itself and is only used by the viewer. The engine does not require the configuration data, as such data is used only by the viewers' internal logic. All the access from the engine to the components is done via interfaces.

To add a new component to the application layout, a user simply needs to drag-and-drop the new component into an empty window pane in the layout. As a result, the new component will automatically become available for access. Once a viewer is developed for Any time a new component (such as those described in the preceding paragraphs) is added to event environment 600, the runtime discovery aspect of the event management system of the invention allows the system to automatically detect and incorporate the new component into the system. The runtime display aspect of the invention allows information about these components to be automatically incorporated into the graphical display for the event management event system. This information may include, for example, video images received from a video camera component or a video monitoring station, access attempt information from an access control panel or alarm management panel, etc. Also, the application designer module of the invention may enable, for example, system administrators to create application layouts for accessing pre-existing system components in an event environment such as those in event environment 600, as well as newly added system components. How these components may be incorporated has been previously described.

Figure 7:
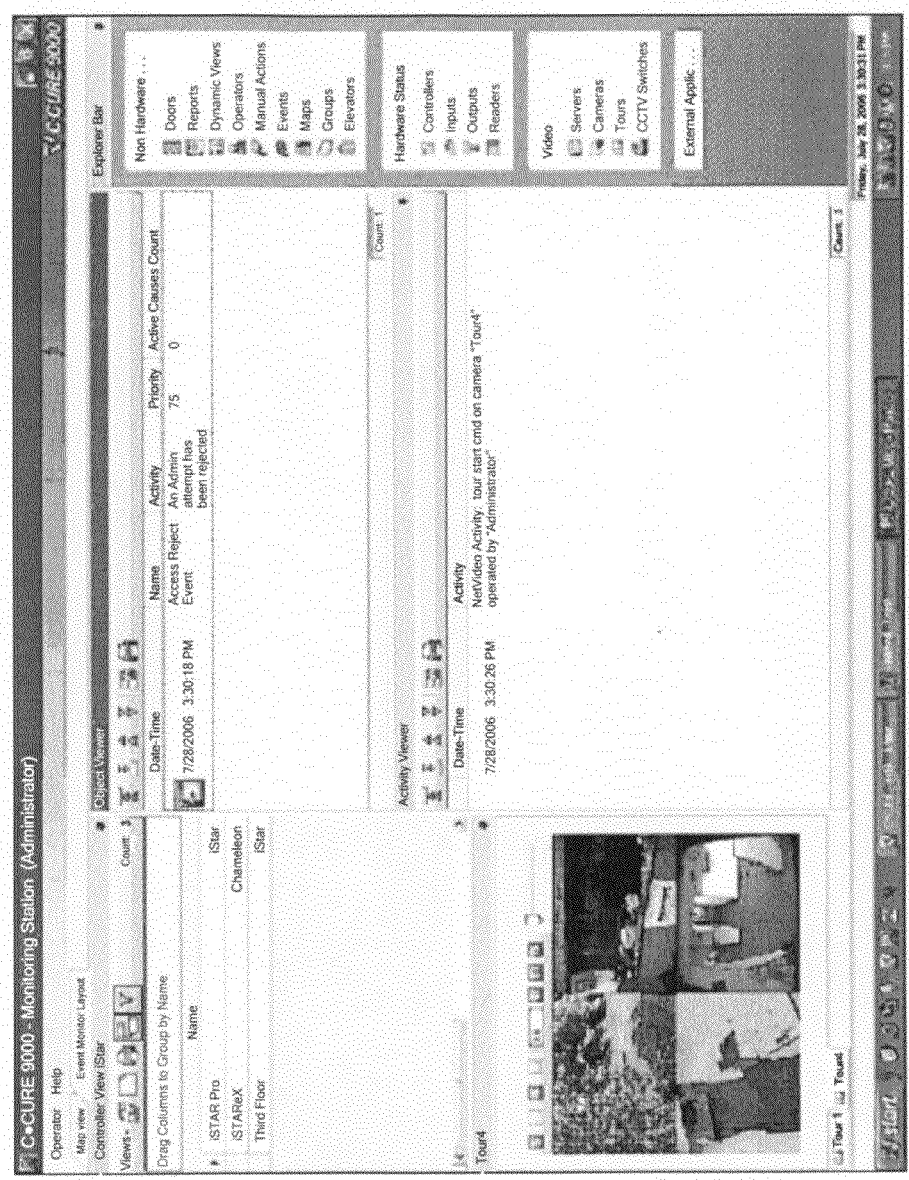
FIG. 7 illustrates a graphical user interface for an event management system in accordance with the invention used in an event environment.

FIG. 7 illustrated a graphical user interface and display 700 for an event management system in an event environment, such as event environment 600. As shown in FIG. 7, display 700 may include images from video surveillance systems, various system components, such as access control panels, alarm management panel, doors and entryways whose access is restricted by card readers controlled by these panels, etc. It may also display information from these systems, and provide access to other information integrated into the system, such as overlay maps. These have also been previously described above in connection with the discussion of the runtime discovery, runtime display, and application designer aspects of the invention.

Although the invention has been described in terms of embodiments, it is not limited thereto. Rather, the appended claims should be construed broadly to include other variants and embodiments of the invention which may be made by those skilled in the art without departing from the scope and range of equivalents of the invention.

The invention claimed is:

1. An event management system, comprising:
a physical server comprising a platform component architecture (PCA) arranged to operate as a common interface between a data source and at least one client application having software objects using a first data schema, the PCA arranged to provide interface services to perform runtime discovery of at least one system component, parse user defined database tables and interfaces of the at least one system component as stored in the data source, the user defined database tables and interfaces using a second data schema, and automatically generate a bridge between the first data schema and the second data schema to allow software objects of the at least one system component to communicate with software objects of the client application.

2. The system of claim 1, wherein the PCA further provides at least one of event/action management services, data services, and scheduling services.

3. The system of claim 1, wherein the PCA receives automatic updates to system components via the event management system.

4. The system of claim 1, wherein the PCA is configured for use in designing custom applications, the PCA further comprising an application layout editor.

5. The system of claim 1, the component interface configured to determine display parameters of the at least one system component.

6. The system of claim 1, wherein communication between the server, the data source and the at least one client application is encrypted.

7. The system of claim 1, wherein the at least one system component is configured to have access to the server, the data source, and at least one other system component, and wherein the server, the data source, and the at least one other system component are configured to have access to the at least one system component.

8. The system of claim 1, further comprising a monitoring module configured to allow runtime programming of all programmable hardware devices attached physically or logically to the system.

9. The system of claim 1, further comprising a managing module that provides the at least one client application the ability to manage user-defined events by at least one of manually, on a scheduled basis and a condition-related basis.

10. The system of claim 1, wherein the data source is configured to audit and validate user-defined objects and applications prior to storing the user-defined objects and applications.

11. The system of claim 1, further comprising at least one security device connected to the event management system and capable of being monitored by the at least one client application.

12. A method for event management, comprising:
providing a server having a platform component architecture (PCA);
adding, during runtime, at least one system component to the PCA;
detecting properties and functions of the at least one added system component by a detection module within the PCA;
generating a bridge between a first data schema used by software objects of a client application and a second data schema used by a database table to store information for the at least one added system component;
integrating the at least one added system component to the PCA, wherein the at least one added system component is made accessible to the at least one client; and
displaying the at least one added system component on a common interface between the server, a data source, and the at least one client.

13. The method of claim 12 further comprising sharing properties and functions of the at least one added system component with a different at least one system component of the event management system, wherein the different at least one system component can use the properties and functions of the at least one added system component.

14. The method of claim 12, wherein the step of adding is performed by a third party.

15. The method of claim 12, further comprising allowing the at least one client to manage the user privileges and personal views of the at least one added system component to the PCA.

16. The method of claim 15, wherein the step of managing can be performed on at least one of a scheduled basis, a condition-related basis, and through a scheduling service provided by the PCA.

17. The method of claim 12, further comprising updating the at least one added system component through an automatic update service.

18. The method of claim 12, wherein the server and other system components are configured to utilize methods and properties of the at least one added system component.

19. The method of claim 12, further comprising the step of providing custom application designs through an application layout editor on the PCA.

20. The method of claim 12, further comprising the step of auditing and validating the at least one system component prior to integrating the at least one system component to the PCA.

21. The method of claim 20 wherein the step of auditing includes at least one of data imported, data/time stamps, and operator information.

22. An application designer, comprising:
  a physical server comprising a platform component architecture (PCA) configured to provide interface services to generate a bridge between a first data schema used by software objects of a client application and a second data schema used by a database table to store information for a newly added system component; and
  an agnostic software engine included in the PCA and when executed by a processor is configured to allow a user to create customizable application layouts associated with system components, wherein a first of the application layouts is associated with a pre-existing system component and a second of the application layouts is associated with the newly added system component.

23. The application designer of claim 22 wherein the agnostic software engine further comprises an application layout editor configured to provide the customizable application layouts.

24. The application designer of claim 23 wherein the application layout editor comprises a plurality of panes selected by a user to display the customizable application layouts.

* * * * *

UNITED STATES PATENT AND TRADEMARK OFFICE
CERTIFICATE OF CORRECTION

PATENT NO. : 8,478,850 B2  
APPLICATION NO. : 11/903995  
DATED : July 2, 2013  
INVENTOR(S) : Delany et al.

Page 1 of 1

It is certified that error appears in the above-identified patent and that said Letters Patent is hereby corrected as shown below:

On the Title Page, Item (75), Inventor's name "Tarmey Stephen" should be changed to
--Stephen Tarmey--

Signed and Sealed this  
Thirty-first Day of December, 2013

Margaret A. Focarino  
*Commissioner for Patents of the United States Patent and Trademark Office*